(12) United States Patent
Fuerle

(10) Patent No.: US 7,494,311 B2
(45) Date of Patent: Feb. 24, 2009

(54) UNDERCUT SCREW AND MATCHING BIT

(76) Inventor: Richard D. Fuerle, 1711 W. River Rd., Grand Island, NY (US) 14072

( * ) Notice: Subject to any disclaimer, the term of this patent is extended or adjusted under 35 U.S.C. 154(b) by 930 days.

(21) Appl. No.: 10/249,569

(22) Filed: Apr. 19, 2003

(65) Prior Publication Data

US 2003/0230176 A1    Dec. 18, 2003

Related U.S. Application Data

(63) Continuation-in-part of application No. 10/248,790, filed on Feb. 19, 2003, now abandoned.

(51) Int. Cl.
*F16B 23/00* (2006.01)
*B25B 23/08* (2006.01)

(52) U.S. Cl. .......................... 411/407; 411/919; 81/451; 81/460

(58) Field of Classification Search ............... 81/451, 81/441, 460, 186, 442–449, 461; 411/403, 411/406, 407, 409, 919, 404, 398, 399
See application file for complete search history.

(56) References Cited

U.S. PATENT DOCUMENTS

| | | | | |
|---|---|---|---|---|
| 66,585 A | * | 7/1867 | Harvey | 81/443 |
| 246,368 A | * | 8/1881 | Campbell | 411/399 |
| 378,614 A | * | 2/1888 | Palmer | 411/399 |
| 610,423 A | * | 9/1898 | Van Ommeren | 411/405 |
| 748,241 A | * | 12/1903 | Walters | 81/438 |
| 805,072 A | * | 11/1905 | Jackson | 29/270 |
| 1,263,971 A | * | 4/1918 | Smith | 38/142 |
| 1,956,963 A | * | 5/1934 | Salmen, Jr. | 411/405 |
| 2,451,747 A | * | 10/1948 | Kindt | 164/249 |
| 2,566,055 A | * | 8/1951 | Daderko, Sr. et al. | 81/436 |
| 2,684,094 A | * | 7/1954 | Lissy | 81/436 |
| 3,259,000 A | * | 7/1966 | Lasch, Sr. | 81/176.15 |
| 3,311,002 A | * | 3/1967 | Hoose | 81/118 |
| 4,480,514 A | * | 11/1984 | Ponziani | 81/461 |
| 4,936,172 A | * | 6/1990 | Jackson | 81/460 |
| 5,762,457 A | * | 6/1998 | Lide | 411/405 |
| 6,334,748 B1 | * | 1/2002 | Gudjonsson | 411/399 |

* cited by examiner

*Primary Examiner*—Hadi Shakeri
(74) *Attorney, Agent, or Firm*—Richard D. Fuerle

(57) ABSTRACT

A threaded fastener, such as a screw or a bolt, has a central longitudinal axis in a z-axis direction. The fastener has a head and a threaded shaft. The head has an overhanging periphery in an x-y plane and at least two slots, evenly-spaced apart, that extend completely through the overhanging periphery. Each slot has a sloped surface that undercuts the overhanging periphery in the same tangential direction. The screw is turned by using a bit that has a central longitudinal axis in a z-axis direction. The bit has a shank fixed to an end portion and at least two legs, evenly-spaced apart, extend from the end portion in a z-axis direction. Each leg has a sloped surface that extends in the same tangential direction.

6 Claims, 13 Drawing Sheets

UNDERCUT SCREW AND MATCHING BIT

CROSS REFERENCE TO RELATED APPLICATIONS

This application is a continuation-in-part of application Ser. No. 10/248,790, filed Feb. 19, 2003, which is a continuation-in-part of application Ser. No. 10/064,150, filed Jun. 14, 2002, issued Mar. 4, 2003 as U.S. Pat. No. 6,526,851.

BACKGROUND OF INVENTION

This invention relates to a novel screw and matching novel bit. In particular, it relates to a screw having at least two undercut slots at the periphery of its head, and to a bit that engages those slots.

Power screwdrivers are now used more and more, especially when a large number of screws must be fastened. Power screwdrivers can produce greater torque than can a human, but if the rotation of the driver is not stopped immediately when the bottom of the head of the screw hits the surface into which the screw is being driven, both the slot in the screw and the bit can be stripped, destroying the bit and making it difficult to remove the screw. It is not easy to stop the driver just when the head of the screw contacts the surface, so stripped screws and ruined bits are common. This is especially true of Phillips screwdrivers (X-shaped slots) and square drives (where the slot is a square well) because the bit engages the slot so close to the center of the head of the screw that there is very little mechanical advantage. In addition, the torque of the driver tends to force the bit out of the slot, so that the operator must apply considerable pressure to keep the bit in the slot.

U.S. Pat. No. 6,526,851, the grandparent of this application, shows a screw having an undercut slot and a matching bit. The bit can be easily inserted into the slot and, when the bit is turned to tighten the screw, the bit is forced towards the screw and will not easily disengage from the screw in a vertical (z-axis) direction. Also, the bit applies torque to the periphery of the head of the screw, not to the center, thereby reducing the likelihood that the screw and bit will be stripped. However, the bit can still slide out of the slot in a horizontal (x-axis) direction. Also, unlike a Phillips screw, where the bit slides into position as it engages the screw, the bit does not automatically slide into position at the center of the slot and the user must place it in the center and keep it there while tightening the screw.

U.S. patent application Ser. No. 10/248,790, the parent of this application, shows a screw and bit that are similar to that of U.S. Pat. No. 6,526,851, but there is a protuberance in the center of the slot and a matching well in the center of the bit. The protuberance and well guide the bit to the proper position and prevent the bit from sliding out of the slot along its length. While the use of the protuberance and well is an improvement over the screw and bit of U.S. Pat. No. 6,526,851, the screws of both U.S. patent application Ser. No. 10/248,790 and U.S. Pat. No. 6,526,851 are difficult to manufacture using cold heading, the most common technology for making inexpensive screws. Thus, it would be desirable to have a screw and bit with all of the advantages of the screws and bits of U.S. patent application Ser. No. 10,248,790 and of U.S. Pat. No. 6,526,851, but which can be easily made by cold heading.

SUMMARY OF INVENTION

Like the screw and bit disclosed in the parents of this application, the bit of this invention is easily inserted directly into the undercut slot in the head of the screw, the bit applies torque to the periphery of the head of the screw, not near the center, and the bit cannot be easily removed from the slot in a vertical (z-axis) or horizontal (x or y-axis) direction once the bit has been turned. But unlike the screw in those inventions, the screw of this invention can be easily made by cold heading.

DETAILED DESCRIPTION

Figure 1:
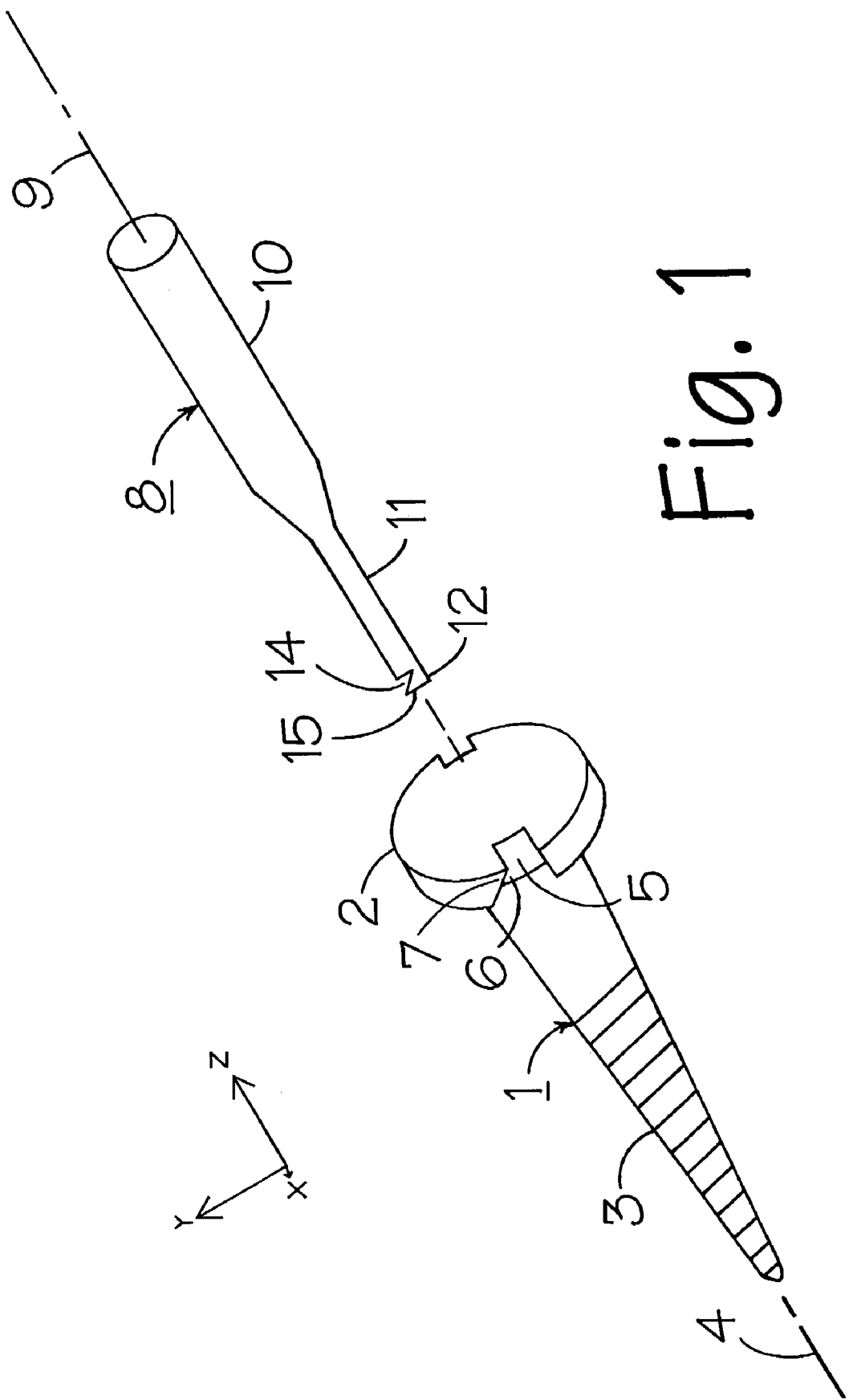
FIG. 1 is an isometric view illustrating a certain presently preferred embodiment of a pan head screw and corresponding bit according to this invention.

In FIGS. 1, 2, 3, and 4, pan head screw 1 has a head 2 and threaded shaft 3 and is centered on longitudinal axis 4. At the periphery of a diameter of head 2 are two slots 5, which extend completely through head 2 of screw 1. By positioning dies in the shape of slots 5 around a wire blank, screw 1 can be made by cold heading. Slots 5 may have a variety of shapes and dimensions appropriate for the type of screw to be used. A slot bound on three sides by the head of the screw (as in FIG. 1) may have a width (tangential direction) of about ⅟32 to about ¼ inches. (A "tangential" direction is a direction approximately tangent to the periphery of the head of the screw, i.e., a direction that will turn the screw clockwise or counterclockwise.) Each slot 5 has an undercut portion 6 on one side, the side to which clockwise torque is applied to head 1. The undercut portions 6 form wedges 7; the peak of each wedge points in a counterclockwise direction. (If a counterclockwise torque is to be applied to screw 1, the opposite side of the slots would be undercut and the peak of the wedges would point in a clockwise direction.) For the most effective use of the torque applied to the screw, the peaks of wedges 7 preferably lie on a radius extending from the center of screw 1 (see FIGS. 3 and 8), but they can also be displaced from a radius, as in FIG. 12. Slots 5 may extend towards the center of head 1 until they reach the top of shaft 3 of screw 1.

Bit 8, centered on longitudinal axis 9, has a shank 10, which can be round, hexagonal, or other shape in cross-section (x-y plane). Shank 10 can be grasped by a chuck (not shown) of a driver, such as an electric screwdriver (not shown). Alternatively, shank 10 can be grasped and turned by hand. If bit 8 is to be inserted into a chuck, shank 10 would typically have a diameter of about ¼ inch, but if shank 10 is to be turned by hand it would typically have a diameter of about ¾ to about 1½ inches.

Figure 4:
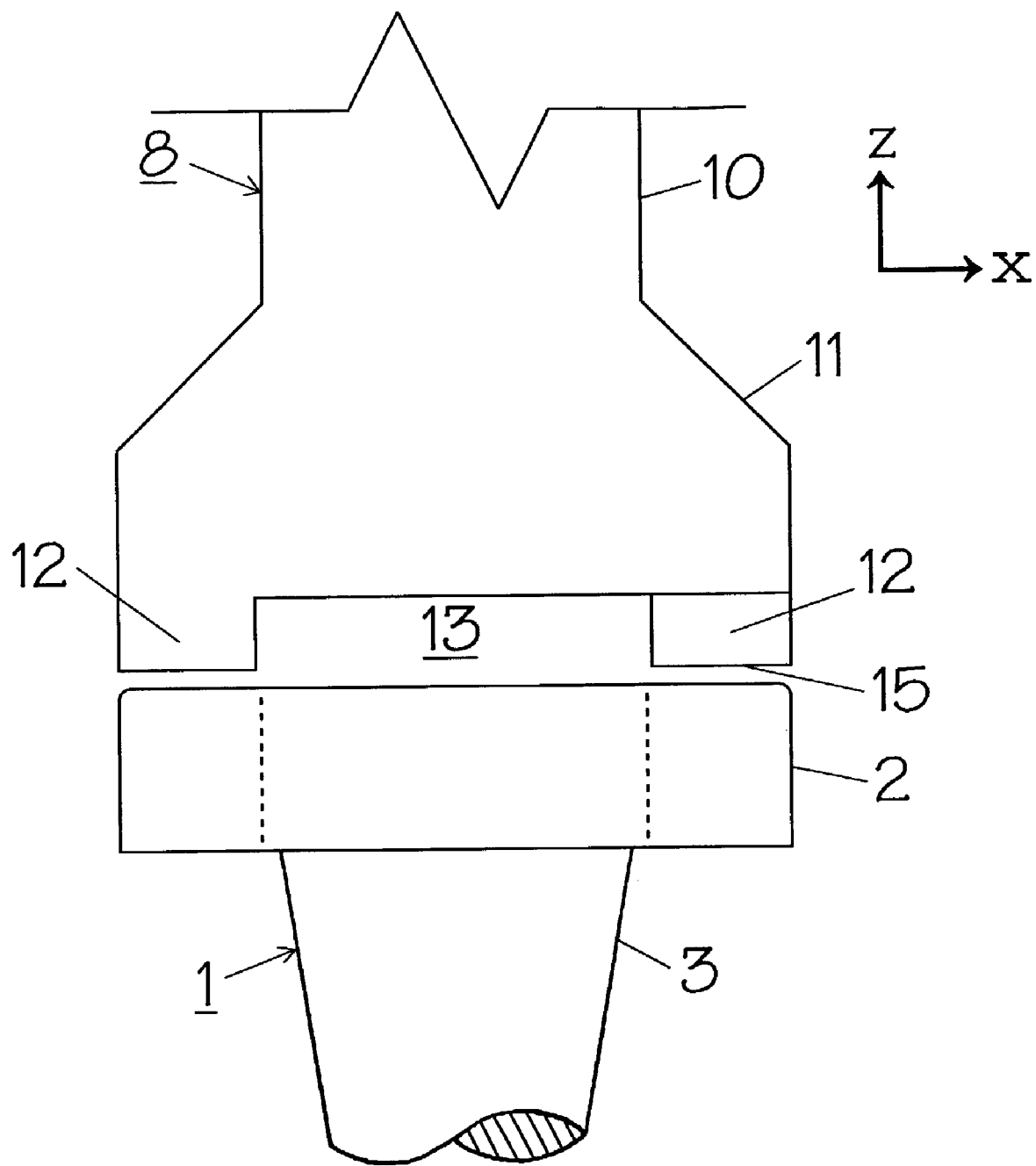
FIG. 4 is a side view (y-axis direction) of the screw and bit shown in FIG. 1.

Fixed to shank 10 is a flat blade 11 which has a leg 12 extending in the z-axis direction from each end so that there is an open area 13 between the two legs 12 (see FIG. 4). When bit 8 engages screw 1, the portion of head 2 that is between slots 5 fits into open area 13 and open area 13 may rest on the top of head 2. If a round head screw is to be engaged, open area 13 may be made concave so as to fit over the convex head.

The width (tangential direction) of legs 12 is less than the width of slots 5 so that legs 12 can be easily slipped directly into slots 5 by movement in a z-axis direction. Each leg 12 has a notch 14 in it, forming foot 15 at the end of leg 12. Since wedges 7 fit into notches 14, notches 14 preferably have the same shape as wedges 7 and contact wedges 7 along both surfaces of wedges 7 when torque is being applied to the screw. Notches 14 have one surface 16 normal to the side 17 of bit 8 and parallel to the surface of head 1 and another surface 18 that preferably slopes at the same angle as wedge 7 when bit 8 engages screw 1. The angle between those two surfaces of notches 14 is preferably about 20 to about 45 degrees, but other angles can also be used. Notches 14 should be deep (y-axis direction) enough to prevent the easy withdrawal of the bit once it has engaged screw 1, but not so deep that foot 15 breaks off.

Figure 2:
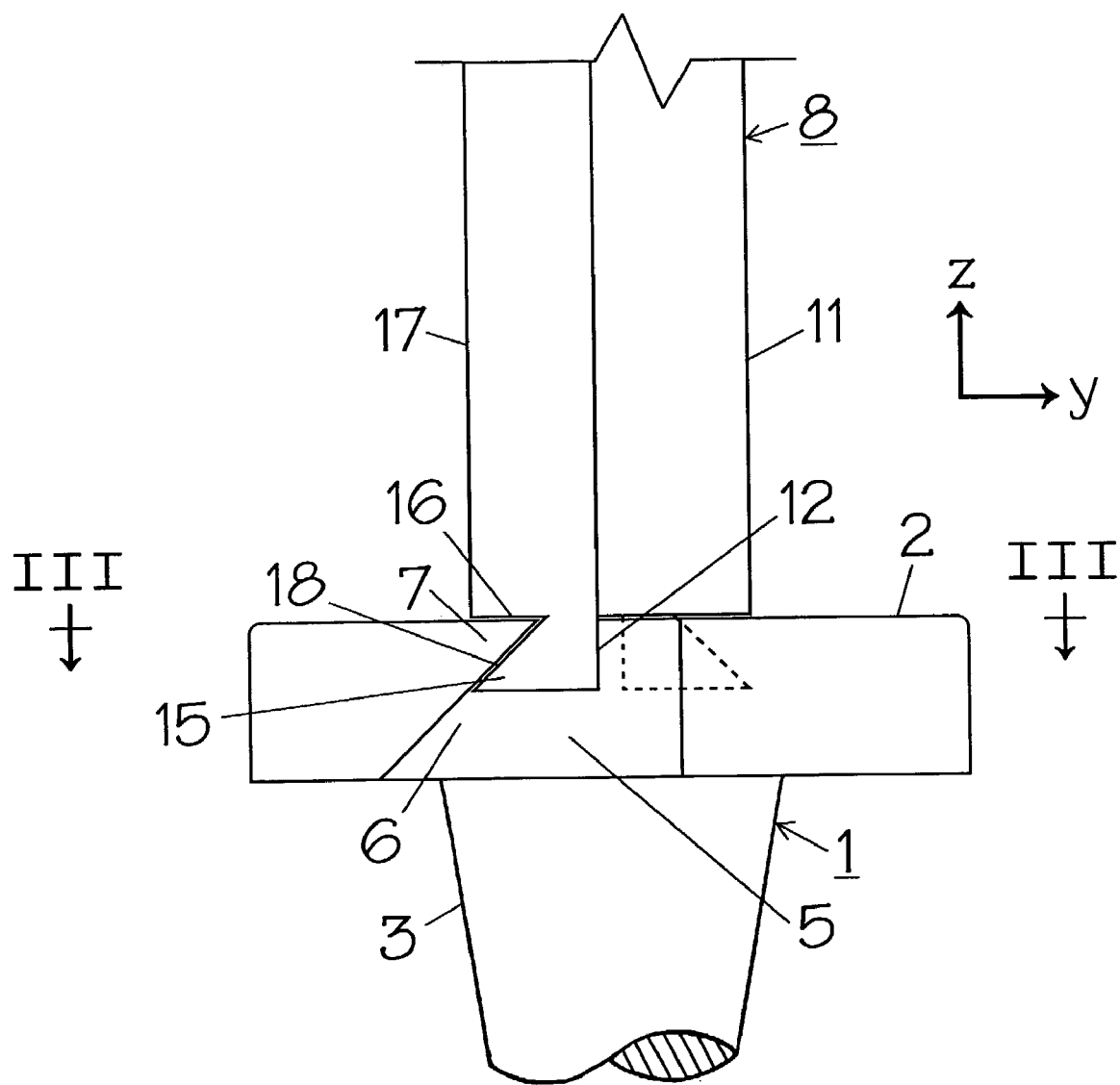
FIG. 2 is an end view (x-axis direction) of the screw and bit shown in FIG. 1, with the bit shown engaging the screw.
Figure 3:
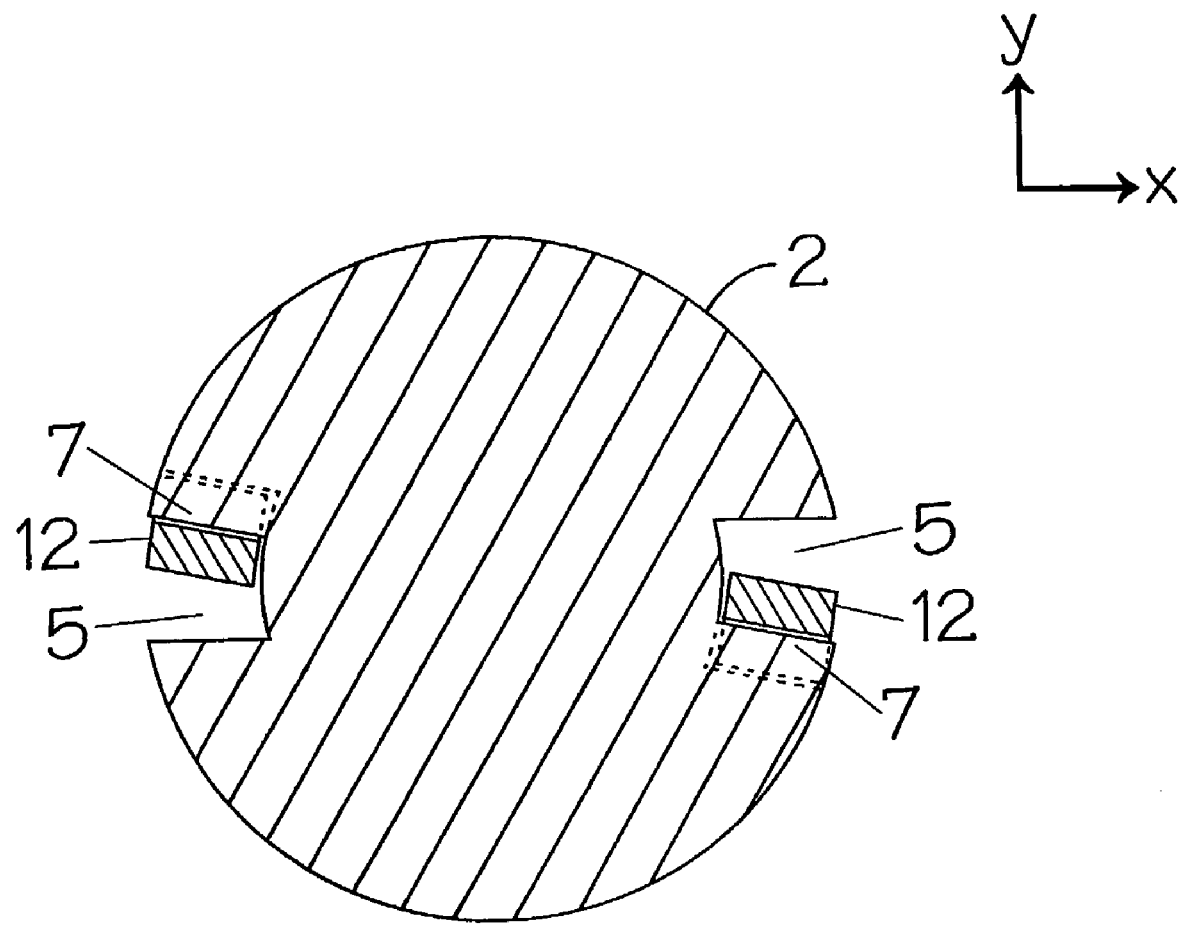
FIG. 3 is a plan view (z-axis direction) through III-III in FIG. 2.

FIG. 2 shows that because wedges 7 are sloped, feet 15 are forced down (z-axis direction) into slot 5 by clockwise torque applied to bit 8. FIG. 3 shows that feet 15 contact wedges 7 at or near the periphery of head 2 so that bit 8 exerts the maximum possible leverage on screw 1.

Figure 5:
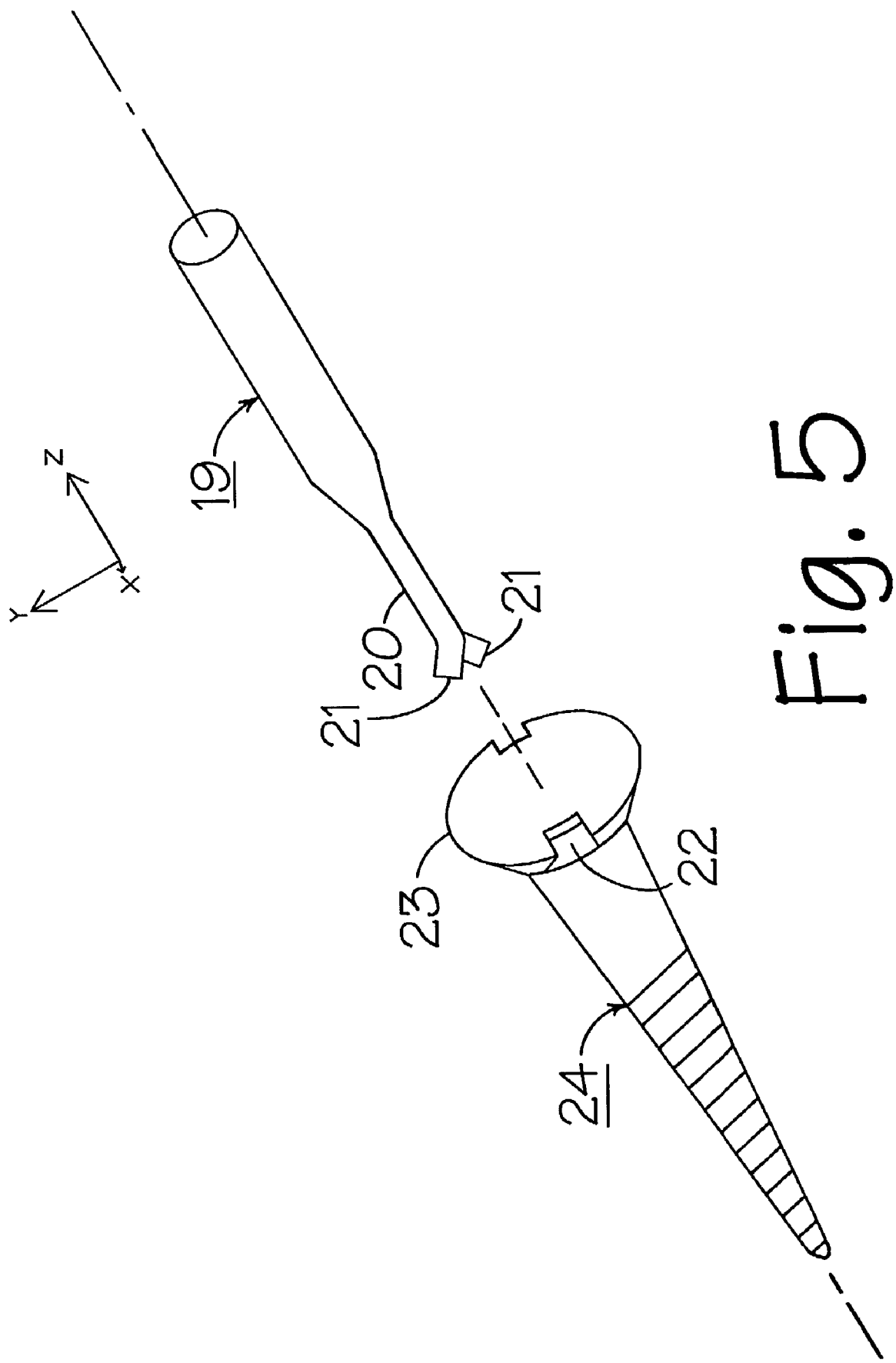
FIG. 5 is an isometric view of another certain presently preferred embodiment of a flat head screw and a corresponding bit according to this invention.
Figure 6:
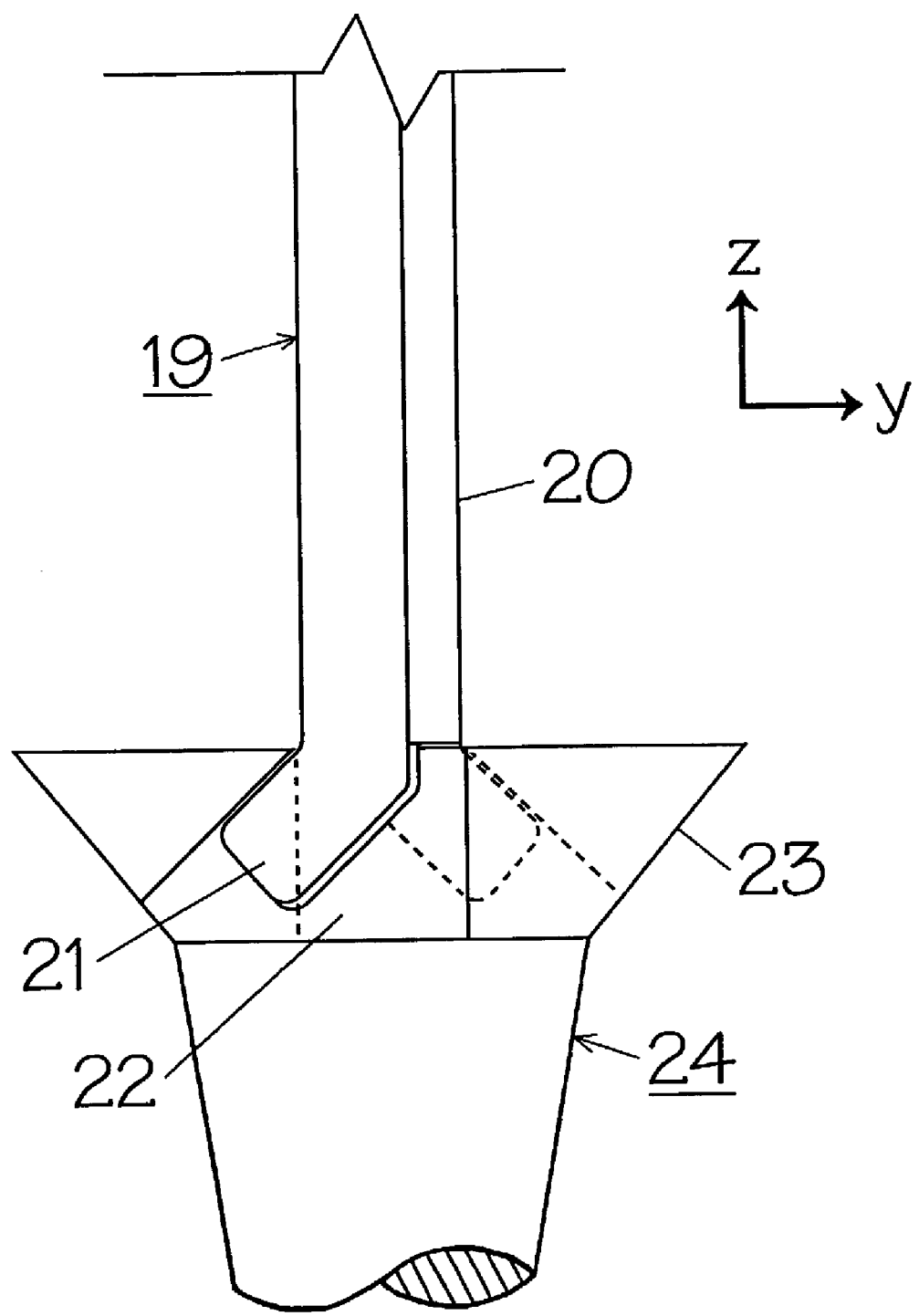
FIG. 6 is an end view (x-axis direction) of the screw and bit of FIG. 5, showing the bit engaging the screw.

FIGS. 5 and 6 illustrate a different embodiment of a bit according to this invention. While the notches 14 in legs 12 can be made by cutting, in FIGS. 5 and 6 the legs can be bent to fit into the undercut portion of the screw. Bit 19 has a flat portion 20 having two legs 21 at each end separated by an open area, as in FIG. 4. Legs 21 have been bent in the same tangential direction (clockwise in FIGS. 5 and 6) so as to fit into the undercut portion of slots 22 in head 23 of screw 24. When a clockwise torque is applied to bit 19, bit 19 cannot be easily removed in either the z-axis direction or the x-axis or y-axis direction. Yet, with a small counterclockwise turn, bit 19 readily disengages from screw 24.

Figure 7:
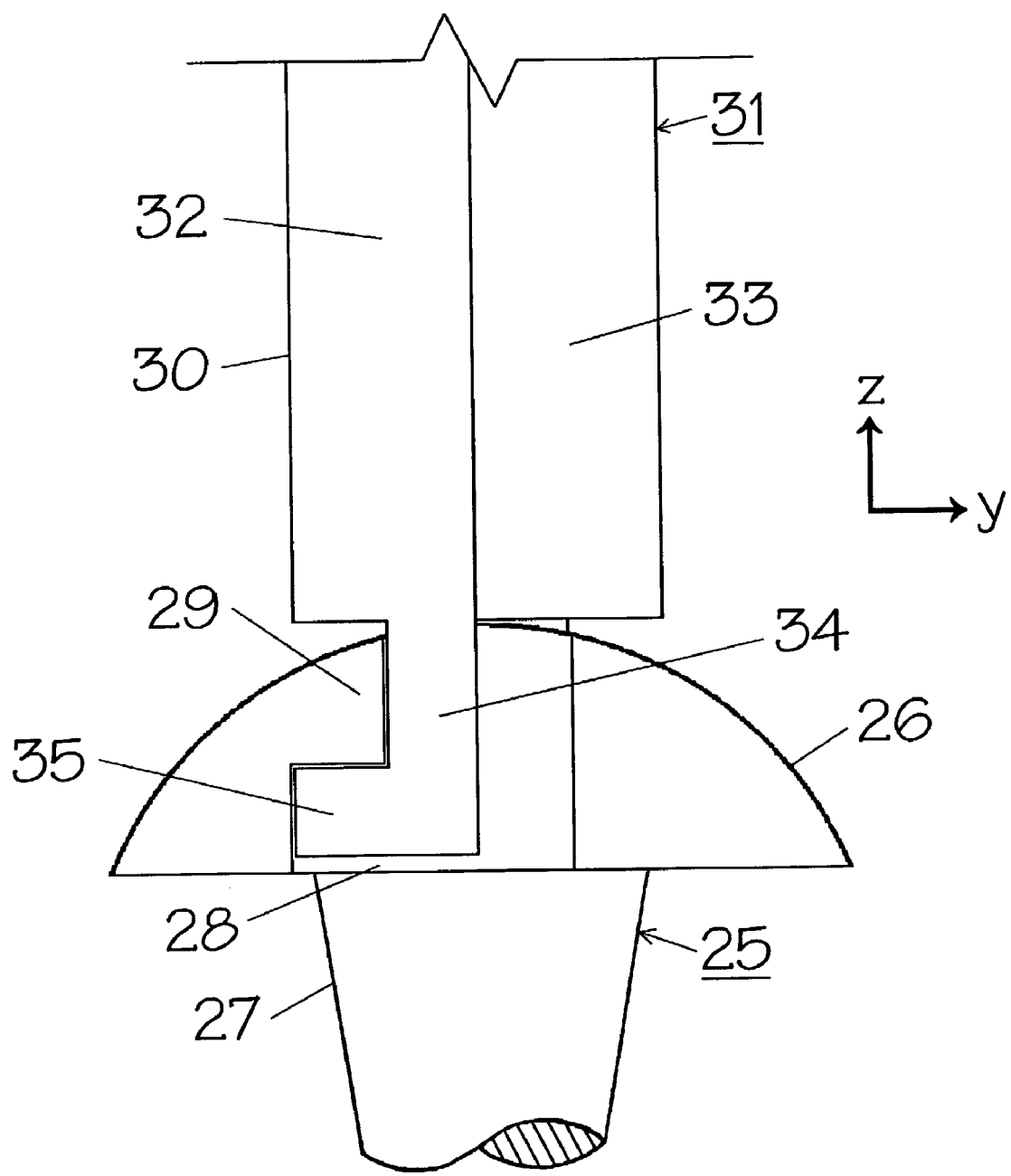
FIG. 7 is an end view (x-axis direction) showing another embodiment of a bit according to this invention engaging a round head screw according to this invention.

In FIG. 7, a round head screw 25 has a head 26 and a threaded shaft 27. Head 26 as two opposing slots 28 (one shown) on the ends of a diameter. Each slot 28 is undercut in the same tangential direction, forming shelves 29. Both shelves 29 extend in the same tangential direction, counter-clockwise, as the screw will be driven in a clockwise direction. Blade 30 of bit 31 is rectangular in cross-section with a short side 32 and a long side 33. Extending in a z-axis direction from each end of blade 30 is a leg 34 that has a foot 35 which extends in a tangential direction, in this case, clockwise, and engages shelves 29 of head 26. The width of short side 32 is less than the width (tangential direction) of slots 28 at the surface of head 26, so that legs 34 can be easily inserted into slots 28.

Figure 8:
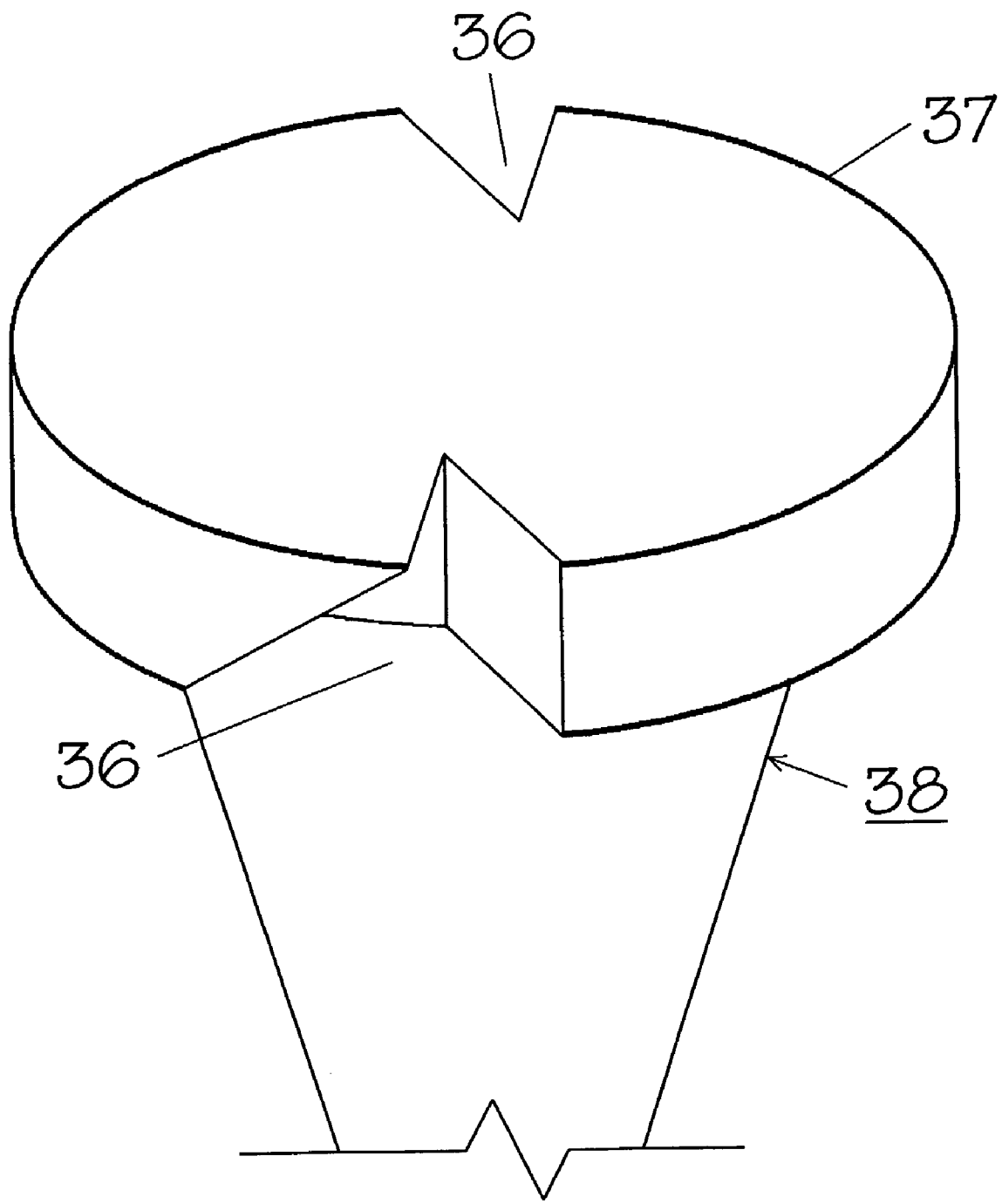
FIG. 8 is an isometric view of a pan head screw according to this invention, where the slots in the head of the screw are triangular.

In FIG. 8, notches 36 in head 37 of a screw 38 are triangular in shape and are engaged by triangularly-shaped legs of a bit (not shown).

Figure 9:
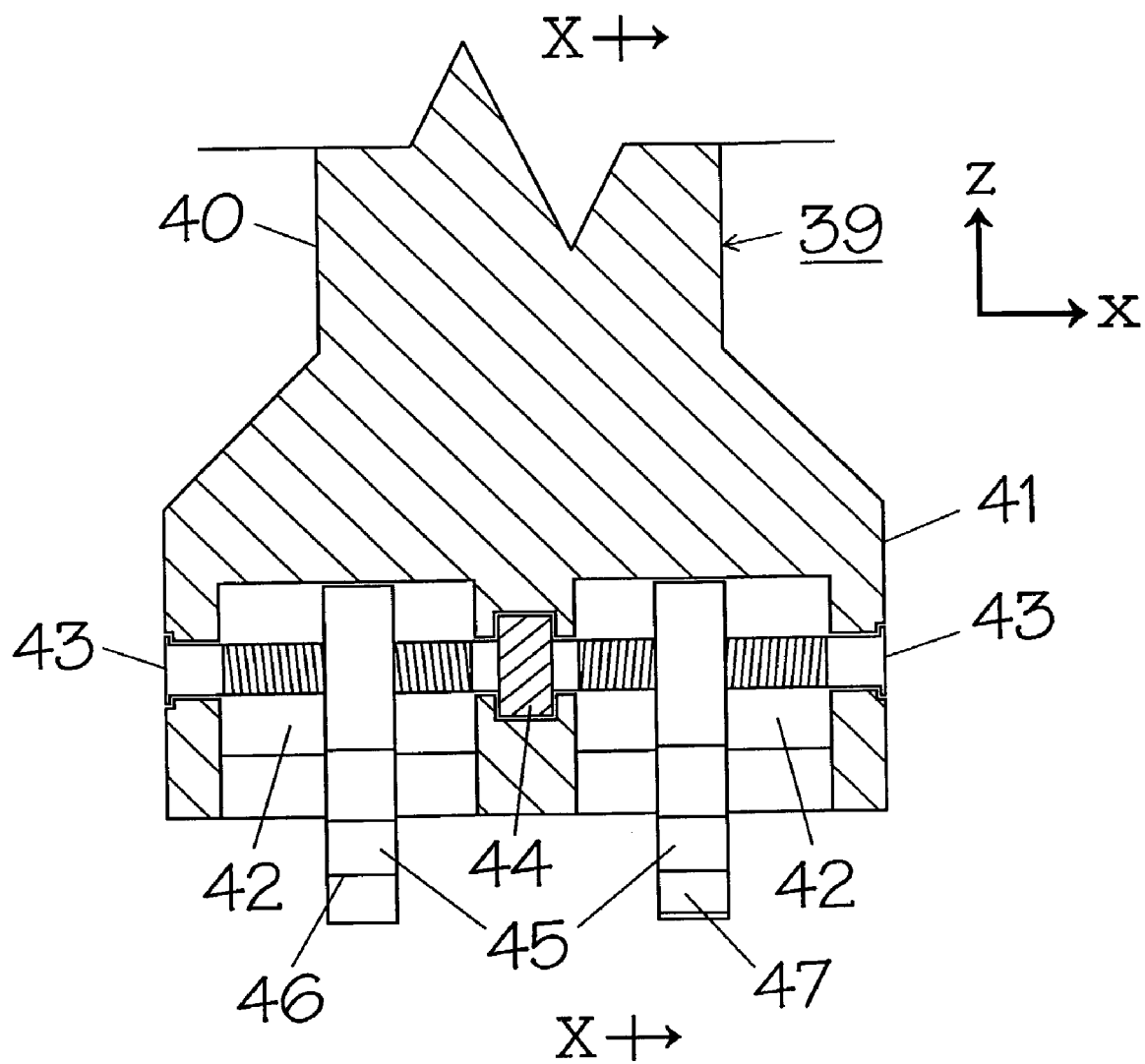
FIG. 9 is a side view (y-axis direction) partially in section of a bit, where the distance between the feet is adjustable.
Figure 10:
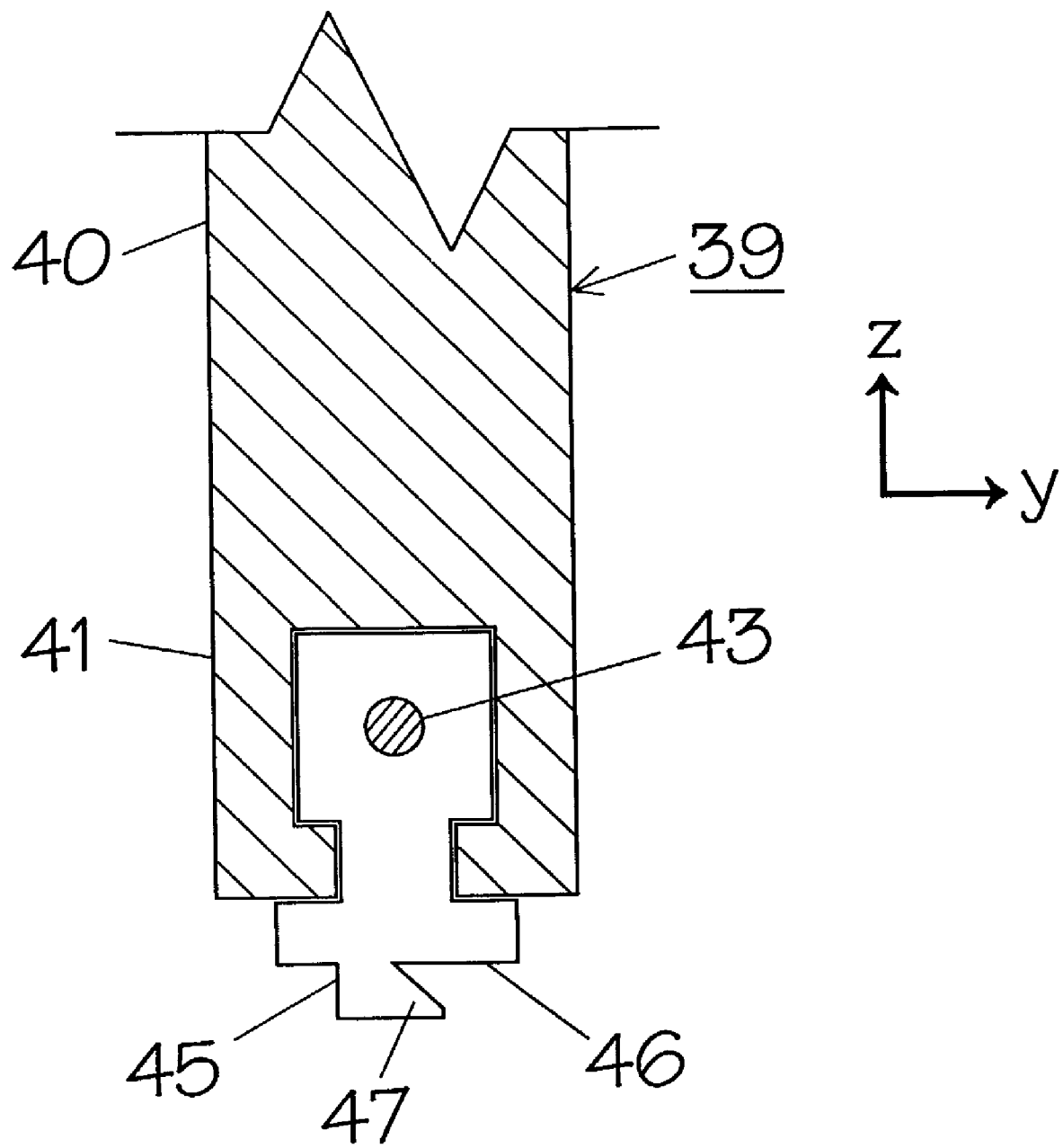
FIG. 10 is an end view (x-axis direction) partially in section of the bit shown in FIG. 9, taken through X-X.

In FIGS. 9 and 10, a bit 39 has a shaft portion 40 and an end portion 41. End portion 41 is provided with two chambers 42 in which is mounted a screw 43 that has a right-handed thread on one half and a left-handed thread on the other half. To screw 43 is fixed lever arm 44, which extends outside end portion 41 and can be turned by hand to rotate screw 43. Two legs 45 are threadedly engaged by screw 43 so that turning screw 43 clockwise or counterclockwise with lever arm 44 moves legs 45 together or apart. Each leg 45 has a shelf 46 which rests on the top of the head of a screw (not shown) and a truncated foot 47, which engages the wedge of a screw.

Figure 11:
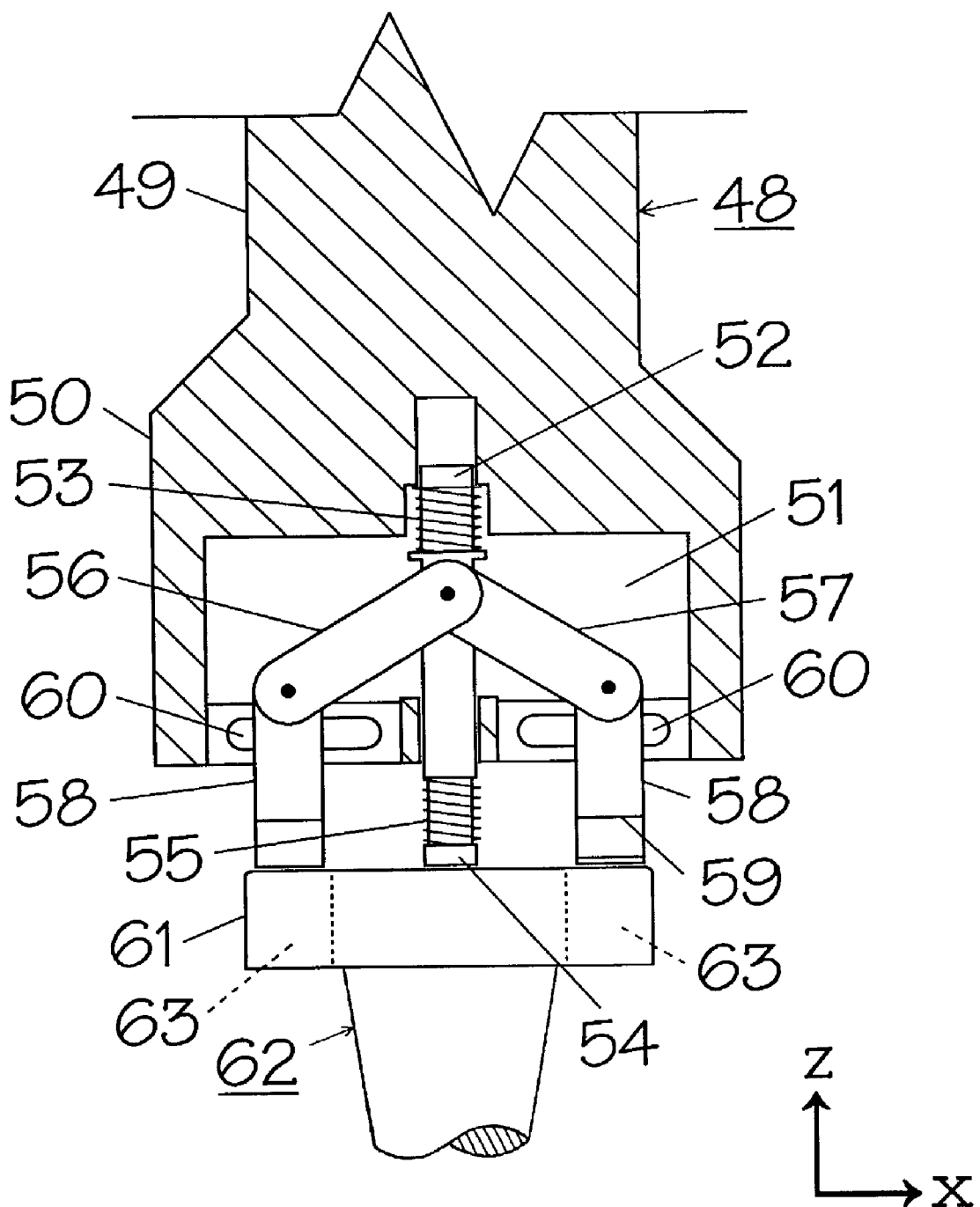
FIG. 11 is a side view (y-axis direction) partially in section of a bit and screw, where the distance between the feet automatically adjusts to the size of the screw.

In FIG. 11, a bit 48 has a shank 49 and an end portion 50 in which there is a chamber 51. Inside chamber 51 is a rod 52 which can move in a z-axis direction. Rod 52 is biased away from shank 49 by spring 53. Inside the end of rod 52 is a plunger 54 which is also biased away from shank 49 by a stronger spring 55. Links 56 and 57 are rotatably connected to rod 52 and to legs 58. Legs 58 have shelves 59, similar to shelves 45 in FIG. 10. Legs 58 are held in slot 60 by pins (not shown) and can slide in an x-axis direction along slots 60. When plunger 54 hits the top of the head 61 of screw 62 it moves towards shank 49, compressing spring 53 and causing legs 58 to move together into the slots 63 (dotted lines) in head 61. When they contact the inside of slots 63 spring 55 compresses as needed until shelves 59 contact head 61.

Figure 12:
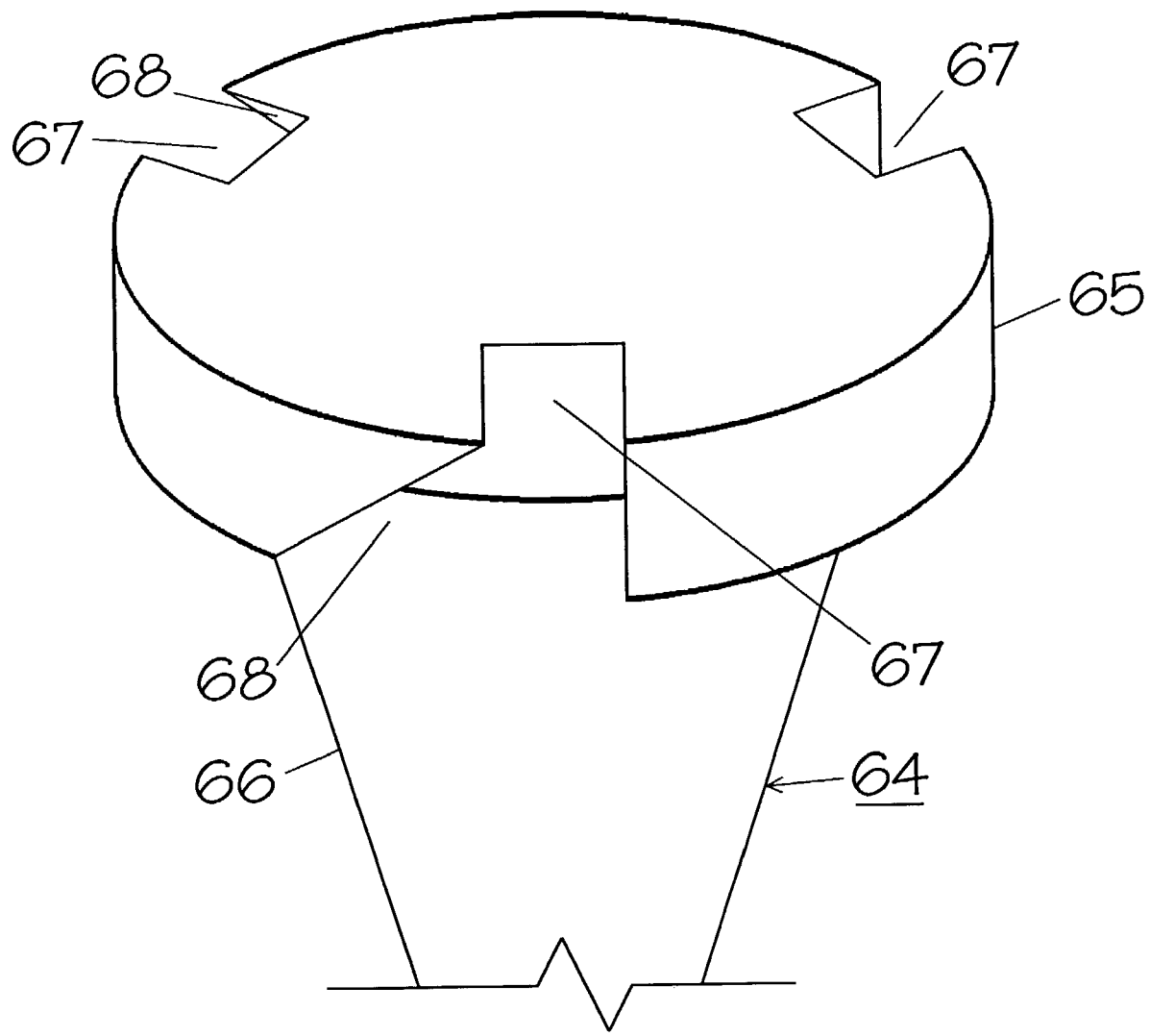
FIG. 12 is an isometric view of another embodiment of a screw according to this invention.

FIG. 12 shows screw 64 having head 65 and threaded shaft 66. There are 3 notches 67 positioned 120° apart on the periphery of head 65, each having an undercut portion 68 that extends in a clockwise direction.

Figure 13:
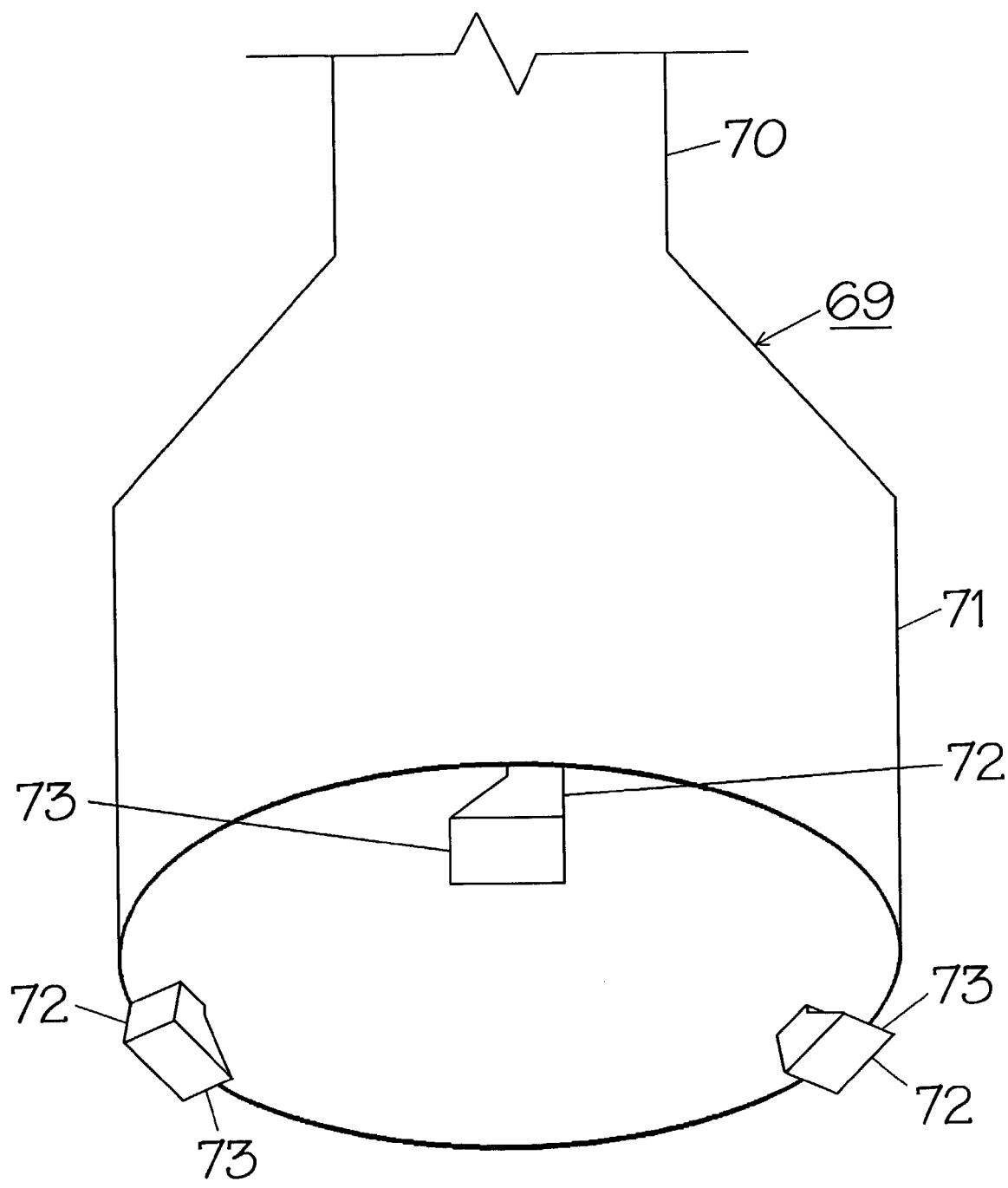
FIG. 13 is a perspective view of a bit according to this invention which is suitable for engaging the screw of FIG. 12.

FIG. 13 shows a bit suitable for engaging the screw of FIG. 11. Bit 69 has a shank portion 70 and an end portion 71. End portion 71 is circular in cross-section and has extending from its base in a z-axis direction three legs 72, each having a foot 73 that extends in a clockwise direction (looking downward). For round head screws, the area between the legs 72 can be hollowed out so that the bottom of end portion 54 is concave.

As will be appreciated by those skilled in the art, the invention is applicable to almost all shapes of threaded fasteners. The shape of the end portion can change with the number of feet. For example, an X shaped end portion could be used for four feet.

The threaded portion of the fastener can be tapered (screws) or non-tapered (bolts).

To use the screw and bit of this invention, the bit is inserted into the chuck of a driver or the shank is grasped, the screw is positioned, the feet of the bit are inserted into the slot, and the bit is rotated. To remove a screw, the bit is inserted into the slot and the direction of rotation is reversed. As the drawings indicate, torque is not applied to an undercut portion of the screw when the screw is being removed. However, less torque is usually required to remove a screw and removal is required infrequently.

The invention claimed is:

1. A flat head or pan head screw having a central longitudinal axis in a z-axis direction comprising a head and a threaded shaft, where no slot extends across the top of said head, said head having (1) a periphery that overhangs said shaft in an x-y plane and (2) two or three evenly-spaced apart slots that extend completely through said overhanging periphery, where each slot has two flat surfaces that extend inward from said periphery, a first flat surface sloped at about 20 to about 45 degrees to a normal to said z-axis direction that undercuts said overhanging periphery in a clockwise direction with respect to said longitudinal axis and a second flat surface parallel to said z-axis direction.

2. A flat head or pan head screw according to claim 1 that has three evenly-spaced apart slots.

3. A threaded fastener according to claim 1 wherein said shaft is tapered.

4. A threaded fastener according to claim 3 that is a pan head screw.

5. A threaded fastener according to claim 3 that is a flat head screw.

6. A threaded fastener according to claim 1 wherein said slots are bounded on three sides by said head.

* * * * *